US012481792B2

(12) United States Patent
Villegas et al.

(10) Patent No.: US 12,481,792 B2
(45) Date of Patent: Nov. 25, 2025

(54) METHOD FOR PROCESSING DIGITAL INFORMATION

(71) Applicant: NAGRAVISION SARL, Cheseaux-sur-Lausanne (CH)

(72) Inventors: Karine Villegas, Cheseaux-sur-Lausanne (CH); Roan Hautier, Cheseaux-sur-Lausanne (CH); Pascal Fuchs, Cheseaux-sur-Lausanne (CH); Fabien Gremaud, Cheseaux-sur-Lausanne (CH)

(73) Assignee: NAGRAVISION SARL, Cheseaux-sur-Lausanne (CH)

( * ) Notice: Subject to any disclaimer, the term of this patent is extended or adjusted under 35 U.S.C. 154(b) by 261 days.

(21) Appl. No.: 17/996,883

(22) PCT Filed: Apr. 19, 2021

(86) PCT No.: PCT/EP2021/060019
§ 371 (c)(1),
(2) Date: Oct. 21, 2022

(87) PCT Pub. No.: WO2021/213951
PCT Pub. Date: Oct. 28, 2021

(65) Prior Publication Data
US 2023/0153470 A1 May 18, 2023

(30) Foreign Application Priority Data
Apr. 23, 2020 (EP) .................................... 20171173

(51) Int. Cl.
*G06F 21/64* (2013.01)
*H04L 9/32* (2006.01)

(52) U.S. Cl.
CPC ............ *G06F 21/64* (2013.01); *H04L 9/3247* (2013.01)

(58) Field of Classification Search
None
See application file for complete search history.

(56) References Cited

U.S. PATENT DOCUMENTS 6,678,837 B1\* 1/2004 Quach ................. G06F 11/1004
712/244
12,086,424 B2\* 9/2024 Shanbhogue ......... G06F 3/0622
(Continued)

OTHER PUBLICATIONS

E-Sushi; "Security issues of a MAC-then-Encrypt-then-MAC approach?"; 2014; Retrieved from the Internet https://crypto.stackexchange.com/questions/18600/security-issues-of-a-mac-then-encrypt-then-mac-approach; pp. 1-3, as printed. (Year: 2014).\*

(Continued)

*Primary Examiner* — Michael W Chao
(74) *Attorney, Agent, or Firm* — Oblon, McClelland, Maier & Neustadt, L.L.P.

(57) ABSTRACT

A method is provided in which digital information is stored in a plurality of segments in an external memory. The method is performed by a processing device and comprises the steps of loading a first integrity table containing a plurality of first integrity elements respectively authenticating the plurality of segments of digital information, and an associated digital signature of the plurality of first integrity elements, from the external memory; verifying the digital signature associated with the first integrity table, and loading segments of digital information in a protected form from the external memory to the processing device.

13 Claims, 5 Drawing Sheets

(56) References Cited

U.S. PATENT DOCUMENTS

| | | | | |
|---|---|---|---|---|
| 12,105,811 | B2* | 10/2024 | Bates | H04L 9/0825 |
| 12,120,229 | B2* | 10/2024 | Tamiya | G09C 1/00 |
| 12,174,754 | B2* | 12/2024 | Kida | H04L 9/3226 |
| 2003/0200454 | A1* | 10/2003 | Foster | G06F 21/6218 |
| | | | | 726/17 |
| 2004/0093507 | A1* | 5/2004 | Courcambeck | G06F 21/72 |
| | | | | 713/193 |
| 2006/0015748 | A1* | 1/2006 | Goto | G06F 21/71 |
| | | | | 713/190 |
| 2006/0080553 | A1* | 4/2006 | Hall | G06F 21/6227 |
| | | | | 713/193 |
| 2006/0095793 | A1* | 5/2006 | Hall | G06F 12/1408 |
| | | | | 711/E12.102 |
| 2006/0107047 | A1* | 5/2006 | Bar-El | G11B 20/00753 |
| | | | | 713/168 |
| 2008/0182659 | A1* | 7/2008 | Sabella | A63F 13/77 |
| | | | | 463/29 |
| 2008/0273550 | A1* | 11/2008 | Dandekar | G06F 11/0793 |
| | | | | 370/465 |
| 2009/0196423 | A1* | 8/2009 | Chandrasekaran | |
| | | | | G06F 16/2358 |
| | | | | 707/999.001 |
| 2009/0254983 | A1* | 10/2009 | Lee | H04L 63/0807 |
| | | | | 726/9 |
| 2010/0185859 | A1* | 7/2010 | Unagami | G06F 21/57 |
| | | | | 713/168 |
| 2010/0281273 | A1* | 11/2010 | Lee | F04B 33/00 |
| | | | | 713/193 |
| 2011/0225653 | A1* | 9/2011 | Maeda | G06F 21/57 |
| | | | | 709/224 |
| 2011/0239297 | A1* | 9/2011 | Unagami | H04N 21/44236 |
| | | | | 726/22 |
| 2014/0223197 | A1* | 8/2014 | Gueron | H04L 9/3242 |
| | | | | 713/193 |
| 2015/0301957 | A1* | 10/2015 | Elias | G06F 21/64 |
| | | | | 726/26 |
| 2015/0317495 | A1* | 11/2015 | Rodgers | H04L 9/3247 |
| | | | | 713/192 |
| 2015/0363333 | A1 | 12/2015 | Wallace et al. | |
| 2018/0091308 | A1* | 3/2018 | Durham | G06F 3/0673 |
| 2020/0004695 | A1* | 1/2020 | Anderson | G06F 16/137 |

OTHER PUBLICATIONS

Joux; Algorithmic Cryptanalysis; 2009; retrieved from the Internet https://www.ush.it/team/ascii/CRC.Algorithmic.Cryptanalysis.Jun.2009.eBook-ELOHiM.pdf; pp. 1-500 as printed. (Year: 2009).*

Barwell et al.; Authenticated Encryption in the Face of Protocol and Side Channel Leakage; 2017; Retrieved from the Internet https://link.springer.com/chapter/10.1007/978-3-319-70694-8_24; pp. 1-31, as printed (Year: 2017).*

International Search Report and Written Opinion mailed on May 11, 2021 in PCT/EP2021/060019 filed on Apr. 19, 2021 (total 14 pages).

Extended European Search Report dated Jul. 6, 2020 in European Application EP 20 17 1173 filed on Apr. 23, 2020 (total 11 pages).

Anonymous, "encryption- Should we MAC-then-encrypt or encrypt-then-MAC? Cryptography Stack Exchange", Dec. 20, 2019, URL: https://web.archive.org/web/20191220201045/https://crypto.stackexchange.com/questions/202/should-we-mac-then-encrypt-or-encrypt-then-mac#, XP055712133, total 11 pages.

* cited by examiner

METHOD FOR PROCESSING DIGITAL INFORMATION

TECHNICAL FIELD

The present disclosure relates to the field of computer security and more precisely to securely processing digital information, such as codes (applications) and/or data.

BACKGROUND

Generally, a processing device that securely processes digital information, for example a smart card, includes hardware resources such as a secure processing unit (SCPU), a volatile memory and a non-volatile memory. The non-volatile memory stores the digital information and, when required to be executed or processed, the digital information may be loaded in the volatile memory.

The processing device may be embedded in a SoC (System on the Chip) having several processing units, several memories and several functionalities. The SoC may be integrated in a larger module.

In a constraint environment like an IoT system (that is, the Internet of Things system), the processing device may have only a small non-volatile memory, such as an OTP (one time programmable) memory, that is used to store a limited amount of information, for example counters and/or keys. The processing device is not used to store the digital information (e.g. codes and/or data). To keep the cost of the processing device low, the digital information is stored in an external non-volatile memory located outside the processing device (for example in the SoC or in the module outside the SoC). A digital information provider may prepare the digital information and store it in the external memory.

This external memory has a large storage capacity, for example of several megabytes. Generally, the storage capacity of the volatile memory (RAM) of the processing device is smaller. The digital information stored in the external memory cannot be loaded in the processing device at one time. Therefore, memory segmentation is used in the external memory to store the digital information in segments, for example in segments of 1 KB (kilobyte). The digital information is loaded into the volatile memory of the processing device segment by segment.

The digital information needs to be protected during storage in the external memory and during loading from the external memory into the processing device. For this purpose, the digital information provider may use various cryptographic operations or algorithms (e.g. encryption algorithm(s) and/or authentication algorithm(s)) using keys.

In particular, the digital information provider may need to authenticate the digital information that is distributed to a plurality of client processing devices. Two main options are possible in order to authenticate the digital information.

A first option is to use a global key to authenticate the digital information (i.e. a same key globally used to authenticate the digital information distributed to a plurality of processing devices). However, the GSMA association now requires the digital information stored in the external memory to be encrypted and authenticated with one or more unique keys (i.e. a key that is generated uniquely for one processing device).

A second option is to use a unique key of the processing device to authenticate the digital information. However, this second option requires to produce as many signatures as there are processing devices, which is very expensive in production.

There is a need to improve the situation. In particular, there is a need to allow that, when the digital information is to be protected by a unique key (i.e. a key uniquely generated for one processing device), the digital information may be authenticated by a digital information provider.

SUMMARY

The present disclosure concerns a method for processing digital information, performed by a processing device, said digital information being stored in a plurality of segments in an external memory, comprising the steps of:

loading a first integrity table containing a plurality of first integrity elements respectively authenticating the plurality of segments of digital information, and an associated digital signature of said plurality of first integrity elements, from the external memory;

verifying the digital signature associated with the first integrity table, loading encrypted segments of digital information from the external memory to the processing device;

loading separately integrity data of the segments of digital information from the external memory, wherein the integrity data of each segment of digital information includes a first integrity element encrypted and a second integrity element authenticating encrypted data resulting from an encryption of said segment of digital information concatenated with said first integrity element; and, for each segment of digital information:

concatenating the encrypted segment of digital information that has been loaded and the corresponding integrity data loaded separately;

verifying the integrity of the encrypted segment of digital information concatenated with the first integrity element encrypted using the second integrity element;

decrypting the segment of digital information and the first integrity element and outputting the segment of digital information and the first integrity element concatenated together;

verifying the integrity of the segment of digital information using the concatenated first integrity element;

checking that the first integrity element matches a corresponding first integrity element in the first integrity table;

processing the segment of digital information.

In the context of this document, the term digital information is used to describe data liable to be loaded into the processing device (or secure element), such as executable code or information generated by executable code or used by executable code, or any data.

With such a configuration, the first integrity elements respectively authenticating the plurality of segments of digital information can be signed with a global key, and each segment of digital information can be protected (e.g. encrypted and/or authenticated) by one or more unique keys, as requested by GSMA. A key of global type is a key generated commonly for a plurality of processing devices. Conversely, a key of unique type is a key generated uniquely for one processing device. For example, a unique key can be generated by the processing device itself.

For example, the integrity of the segment of digital information based on the first integrity element concatenated therewith can be verified with a global key.

The method above defined has originated from a problem of allowing a digital information provider to authenticate digital information provided to a plurality of processing devices with a global key, where it is required by standard rules (e.g. from GSMA) that the digital information should be protected by a unique key of the processing device. However, the present disclosure is not limited to the above configuration of global and unique keys and could be applied to any other configuration of keys.

Thanks to the present method of processing digital information, the authenticity of the segments of digital information is checked indirectly by checking the signature of all the first integrity elements of the segments of digital information, which are for example MACs (Message Authenticated Code) computed from the segments. The first integrity table containing these first integrity elements has a small size and does not require a large storage capacity in the processing device. It can be easily loaded integrally from the external memory to the processing device before loading and/or processing the digital information.

Advantageously, the step of loading the first integrity table is executed during a startup procedure of the processing device.

In some embodiments, the processing device loads from the external memory a second integrity table containing the integrity data for each of the plurality of segments of digital information and stores said second integrity table in an internal storage unit. This can be carried out before loading the segments of information.

For each encrypted segment of digital information that has been loaded, the processing device can then retrieve the corresponding integrity data from the second integrity table that is stored in the internal storage unit in order to concatenate the encrypted segment of digital information and the corresponding integrity data.

An advantage is to have only one read access to the external memory to get all the pieces of integrity data for all segments.

Alternatively, in other embodiments, for each segment of digital information to be processed that is handled by the processing device, the processing device performs an external access to the external memory and loads the corresponding integrity data from a second integrity table that is stored in the external memory.

In an embodiment, the step of verifying the signature of said plurality of first integrity elements is performed using a global key, wherein a global key is a key that is generated and can be used for a plurality of processing devices in one cryptographic algorithm.

In an embodiment, the step of verifying the integrity of the segment of digital information using the first integrity element concatenated with said segment of digital information is performed using also a global key, wherein a global key is a key that is generated and can be used for a plurality of processing devices in one cryptographic algorithm.

In an embodiment, the step of verifying the integrity of the encrypted segment of digital information concatenated with the first integrity element encrypted using the second integrity element and the step of decrypting the segment of digital information and the first integrity element are performed using one or two unique keys, wherein a unique key is a key generated uniquely for the processing device.

The present disclosure also concerns a method for producing digital information, comprising the steps of:
segmenting the digital information in a plurality of segments of digital information;
computing a first integrity element for each of said plurality of segments of digital information, wherein the first integrity element allows authenticating the corresponding segment of digital information, in order to obtain a plurality of first integrity elements respectively associated with the plurality of segments of digital information;
generating a first integrity table containing said plurality of first integrity elements, computing a digital signature of said plurality of first integrity elements and adding said digital signature to the first integrity table;
encrypting the segments of digital information respectively concatenated with the associated first integrity elements to output encrypted data;
for each segment of digital information:
computing a second integrity element authenticating the encrypted data resulting from encrypting said segment of digital information concatenated with said first integrity element and concatenating said encrypted data and the second integrity element;
separating the encrypted segment of digital information and integrity data that includes the first integrity element encrypted and the second integrity element;
adding said integrity data into a second integrity table;
storing the first integrity table, the second integrity table and the encrypted segments of digital information in a memory.

The present disclosure also concerns a device for processing digital information stored in a plurality of segments in an external memory, including a loading unit that is configured to load, from the external memory,
a first integrity table containing a plurality of first integrity elements respectively authenticating the plurality of segments of digital information, and an associated digital signature of said plurality of first integrity element, and
encrypted segments of digital information, and
integrity data of the segments of digital information, wherein the integrity data of each segment of digital information includes a first integrity element encrypted and a second integrity element authenticating encrypted data resulting from an encryption of said segment of digital information concatenated with said first integrity element and are loaded separately from the segment of digital information;
a signature verification unit configured to verify the digital signature associated with the first integrity table;
a concatenating unit that is configured to concatenate an encrypted segment of digital information that has been loaded and the corresponding integrity data loaded separately;
a first integrity verification unit that is configured to verify the integrity of the encrypted segment of digital information concatenated with the first integrity element encrypted using the second integrity element;
a decrypting unit that is configured to decrypt the segment of digital information and the first integrity element and output the segment of digital information and the first integrity element concatenated together;
a second integrity verification unit that is configured to verify the integrity of the segment of digital information using the concatenated first integrity element;
a third integrity verification unit that is configured to check that the first integrity element matches a corresponding first integrity element in the first integrity table;
a processor for processing the segment of digital information.

The present disclosure also concerns a digital information provider for producing digital information, including:

a segmentation unit for segmenting the digital information in a plurality of segments of digital information;

a first generator for generating a first integrity element for each of said plurality of segments of digital information, wherein the first integrity element allows authenticating the corresponding segment of digital information, in order to obtain a plurality of first integrity elements respectively associated with the plurality of segments of digital information;

a second generator for generating a first integrity table containing said plurality of first integrity elements and a digital signature of said plurality of first integrity elements;

an encrypting unit for encrypting the segments of digital information respectively concatenated with the associated first integrity elements into encrypted data;

wherein the first generator is also configured to generate a second integrity element authenticating the encrypted data resulting from encrypting said segment of digital information concatenated with said first integrity element and concatenating said encrypted data and the second integrity element;

a separator for separating the encrypted segment of digital information and integrity data that includes the first integrity element encrypted and the second integrity element;

a third generator for generating a second table of integrity containing said integrity data of each segment of digital information;

a storing unit for storing the first integrity table, the second integrity table and the encrypted segments of digital information in a memory.

The present disclosure also concerns a system including a processing device as previously defined and an external memory storing:

the digital information in a plurality of encrypted segments of digital information;

a first integrity table containing a plurality of first integrity elements respectively authenticating the plurality of segments of digital information and a digital signature of said plurality of first integrity elements;

a second integrity table containing integrity data of the segments of digital information, wherein the integrity data of each segment of digital information includes a first integrity element encrypted and a second integrity element authenticating encrypted data resulting from an encryption of said segment of digital information concatenated with said first integrity element.

The present disclosure also concerns:

a computer program comprising program instructions which, when the program is executed by a processor of a device for processing digital information, cause the device to perform the steps of the first method previously defined;

a non-transitory computer readable medium comprising program instructions for causing a device for processing digital information to perform the steps of the first method previously defined when executed by a processor of the device;

computer program comprising program instructions which, when the program is executed by a processor of a digital information provider, cause the digital information provider to perform the steps of the second method previously defined;

a non-transitory computer readable medium comprising program instructions for causing a digital information provider to perform the steps of the second method previously defined when executed by a processor of the digital information provider.

BRIEF DESCRIPTION OF THE DRAWINGS

Other features, purposes and advantages of the disclosure will become more explicit by means of reading the detailed statement of the non-restrictive embodiments made with reference to the accompanying drawings.

DETAILED DESCRIPTION

Figure 1:
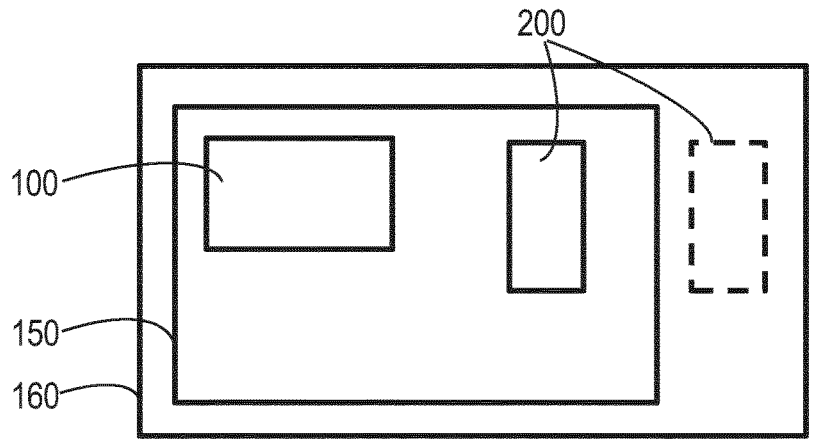
FIG. 1 shows a module embedding a SoC (System on the Chip) having a processing device and an external memory, according to an exemplary embodiment.

FIG. 1 shows a processing device 100 that is embedded for example in a SoC (System on the Chip) 150. The processing device 100 may be a secure element like a smart card or a chip. The SoC 150 may have several processing units, several memories and several functionalities (not represented in FIG. 1). Furthermore, the SoC 150 may be integrated in a larger module 160. For example, this larger module 160 could be an IoT device (typically provided with a unique identifier and the ability to transfer data over a network), a telecommunication apparatus, a location system, a vehicle like a car or a plane, etc. . . .

Different illustrative use cases (not limitative) of the processing device 100 are given below.

In a first exemplary use case, the processing device 100 can be integrated in a modem 160 of a telecommunication system or apparatus. In such a case, the processing device 100 can handle network authentication and download secure applications.

In a second exemplary use case, the processing device 100 can be integrated in a tachograph 160 and securely handle location data.

In a third exemplary use case, the processing device 100 can be integrated in a vehicle 160, for example a car or a plane, to secure and manage safety data transport.

The external memory 200 is a non-volatile memory. Alternatively, the external memory 200 could be a volatile memory. It stores digital information.

The terms "digital information" designate data liable to be loaded into the processing device 100, such as executable code or information generated by executable code or used by executable code, or any other data to be used or processed by the processing device 100.

The processing device 100 is intended to load and process (use) the digital information stored in the external memory 200.

Memory segmentation may be used in the external memory 200. It means that the digital information can be segmented and stored in segments in the external memory 200.

Each segment has a set of associated attributes, such as the type of data contained in the segment, a version of the data, the length of the segment, the address of the segment, etc. These attributes are recorded in a header attached to the segment. There are two main different types of segments, namely code segments including executable code and data segments including digital information which can be used by an application or generated by an application. For example, the segmentation is configured to divide the digital information into segments of a predetermined size, for example 1 kilo-byte (1 KB) (but it can be less for a segment that is not complete).

The digital information is prepared to be stored in the external memory 200. The method of preparing the digital information to be stored in the external memory 200 is initially carried out by a digital information provider 300 (i.e. a system for providing digital information).

Figure 6:
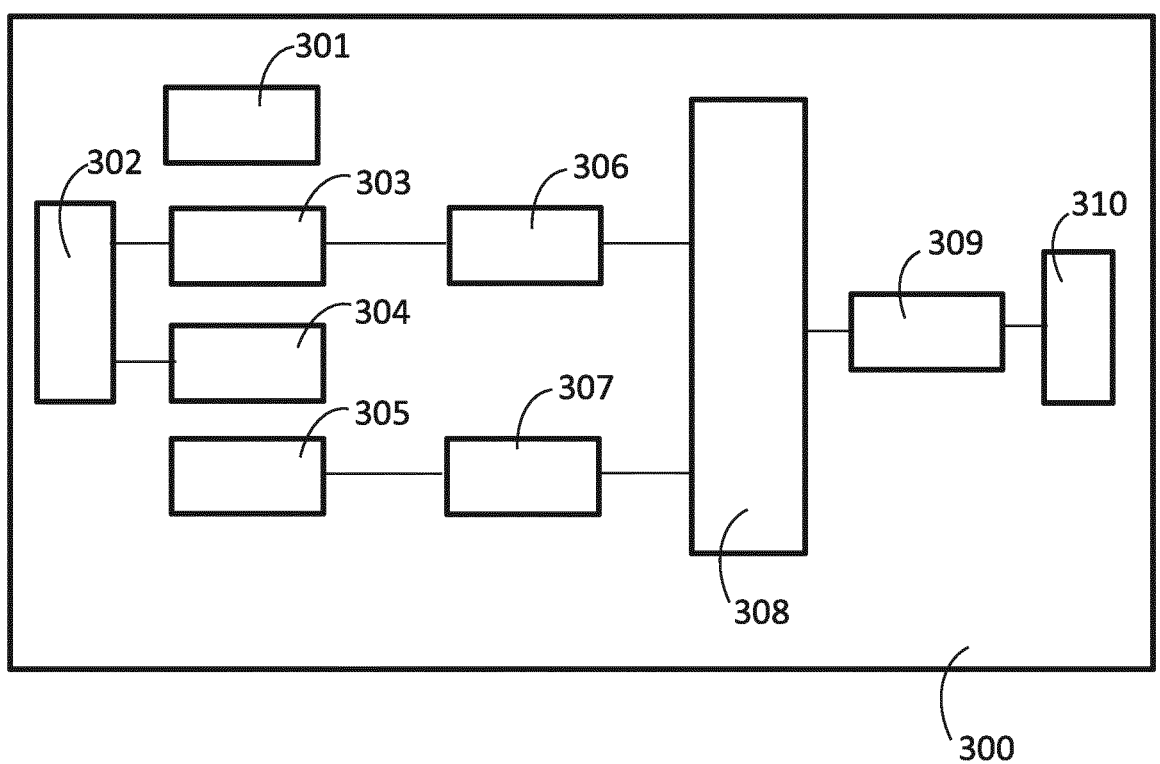
FIG. 6 represents schematically a digital information provider, according to an exemplary embodiment.

With reference to FIG. 6, the digital information provider 300 can have a segmentation unit 301, a key memory 302, a first generator 303, a second generator 306, a third generator 307, an encryption unit 304, a separator 305, a digital information storage unit 309 and a storing unit 310. All these elements are connected to a central processing unit (CPU) 308 that controls the operation thereof. The respective functions of the elements of the digital information provider 300 will become more apparent in the description that follows. The digital information provider 300 can comprise a mix of hardware and software components.

The method of preparing the digital information to be stored in the external memory 200, according to a first exemplary embodiment, will now be described with reference to FIGS. 2 and 3.

In a first step S1, the digital information in clear ("plaintext" in FIG. 2) is divided into M segments of digital information, referenced as 'Si' with $1 \le i \le M$. This step S1 is carried out by the segmentation unit 301.

Then, in order to ensure the confidentiality and authenticity of the digital information, an authenticated encryption is applied to each of the segments of digital information Si, in a step S2. In the present embodiment, the authenticated encryption is based on the well-known authenticated encryption "Encrypt-then-MAC" (EtM) and follows an approach of the type "MAC-then-Encrypt-then-MAC". More precisely, in a step S20, for each segment Si of digital information in clear (plaintext), a first integrity element Ai is produced for the digital information of the segment Si, and the segment Si (plaintext) and the first integrity element Ai are combined (concatenated) together. The result of the concatenation of Si and Ai is referred as Si'. In a following step S22, the segment of digital information Si combined with its first integrity element Ai, i.e. the element Si', are encrypted by the encryption unit 304. The result of the encryption is [Si']=[Si]|[Ai], wherein the brackets represent the encrypted form of a component and the symbol "|" represents the concatenation (or combination) of two components. Then, in a step S23, a second integrity element Bi is produced for the result of the encryption [Si]|[Ai]. The result of the encryption [Si]|[Ai] and the second integrity element Bi are concatenated together to form a segment Si" that contains the segment of digital information in encrypted form and with a double authentication. The steps S20 and S23 are carried out by the first generator 303, here referred as a MAC generator 303. The step S22 is executed by the encryption unit 304. These steps will be described in more detail later in the present description.

Each of the first and second integrity elements Ai, Bi is a short piece of information used to authenticate the digital information, such as a MAC (Message Authentication Code) well-known by the skilled person. In the present disclosure, the first integrity element and the second integrity element related to a same segment Si are referenced as '$A_i$' and 'Bi', with $1 \le i \le M$.

In the step S20 of producing the first MAC Ai, a MAC function (referenced as M in FIG. 2) is used by the MAC generator 303. The MAC function takes the digital information of segment Si in clear (plaintext) as an input and computes the MAC 'Ai' using a first global key $k_0$. This key $k_0$ can be stored in a secure area of the key memory 302.

By definition, a 'global key' is a key that is generated and can be used for a plurality of processing devices in one cryptographic algorithm. In the present embodiment, the first global key $k_0$ is a secret key, for example a key of 256 bits.

The first integrity element Ai is concatenated (combined) with the segment Si of digital information in clear, so as to form the authenticated segment Si' that can be expressed as follows:

$$Si'=Si|Ai.$$

Figure 2:
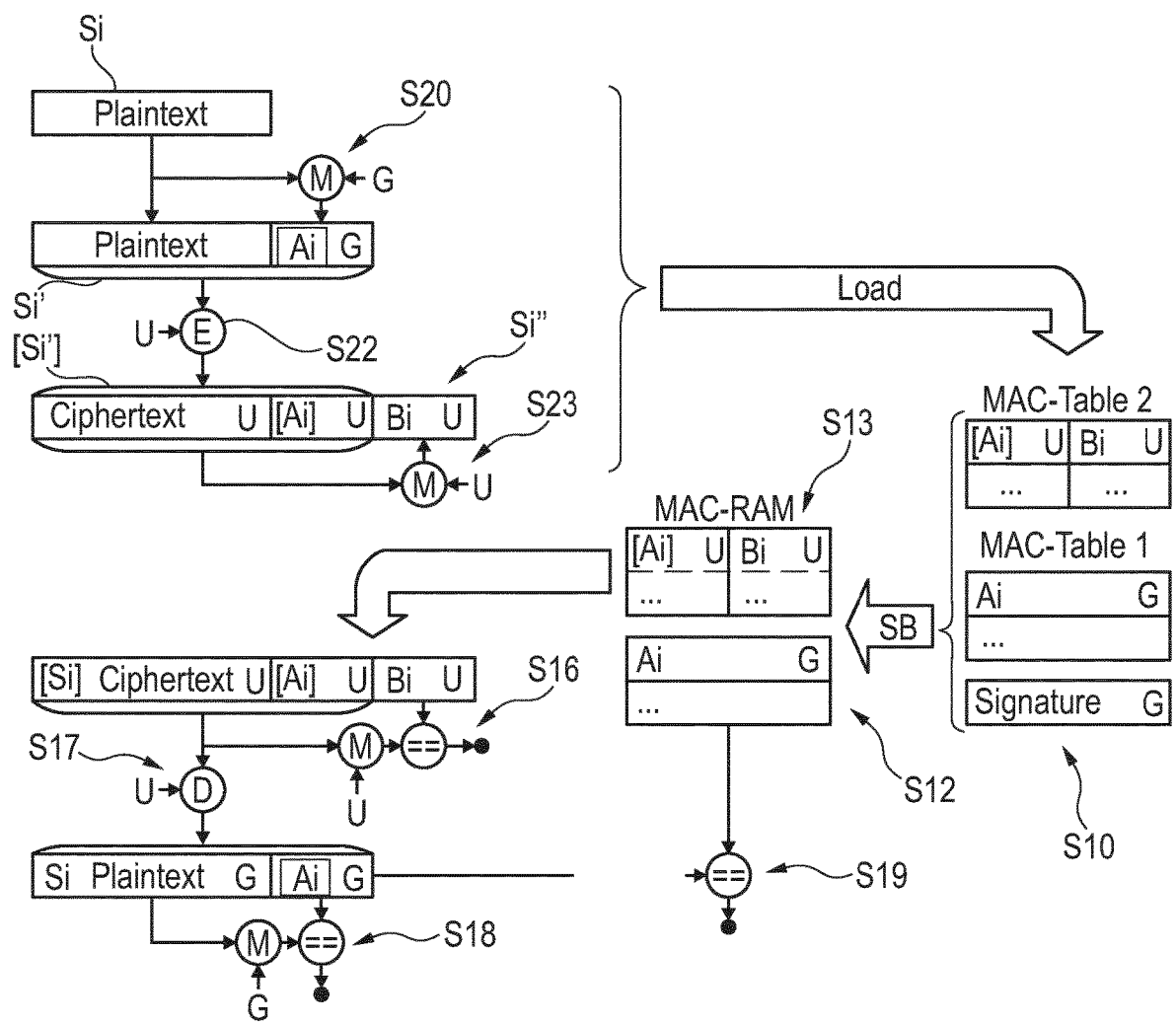
FIG. 2 illustrates schematically the digital information when it is prepared to be stored in an external memory, and when it is loaded and read (or pre-preprocessed) by the processing device, according to a first exemplary embodiment.
Figure 3:
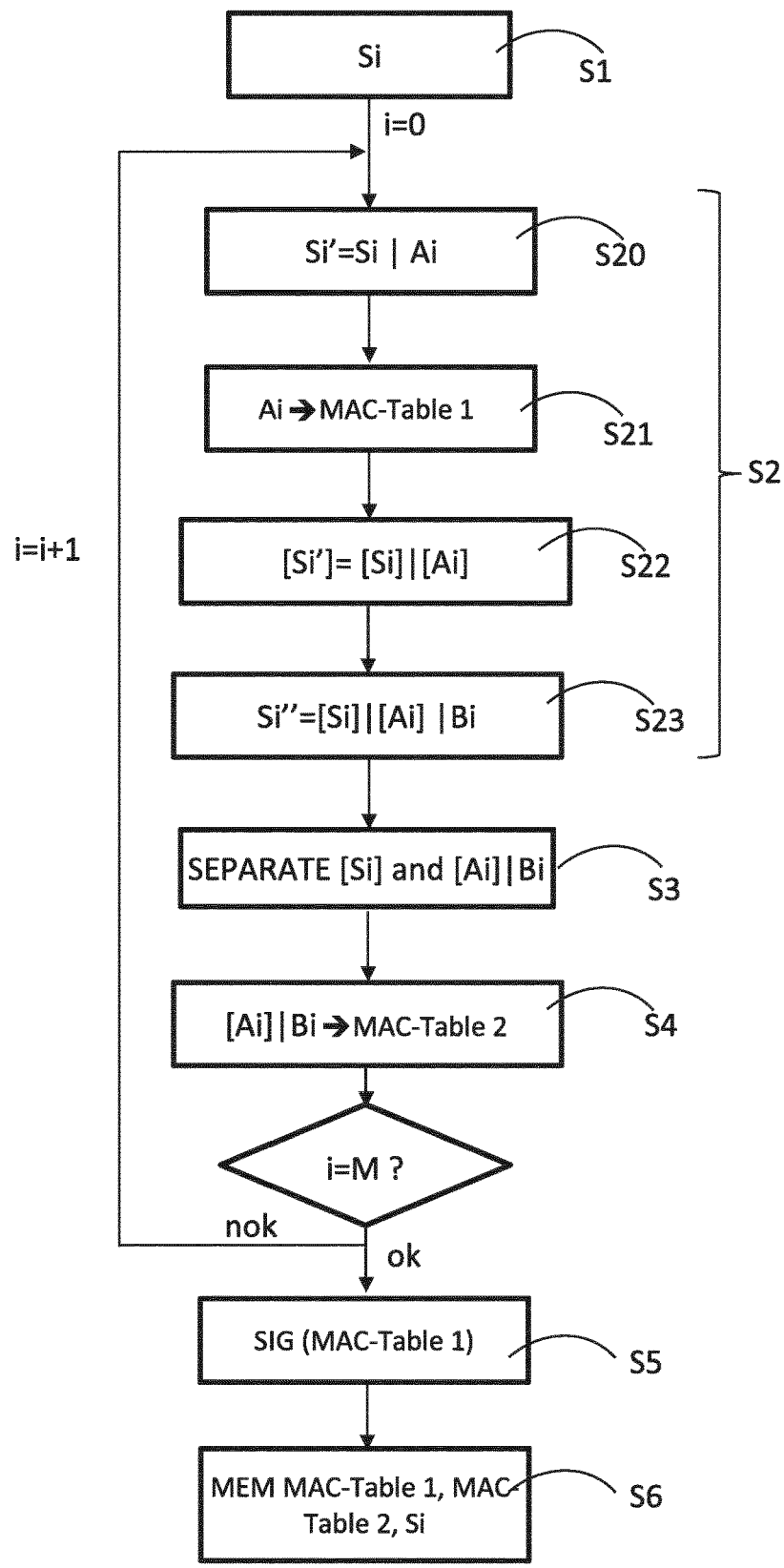
FIG. 3 represents a flowchart of a method of preparing digital information to be stored in the external memory of FIG. 1, carried out by a digital information provider, according to an exemplary embodiment.

In a step S21, the first integrity element Ai produced in step S20 for the segment Si is added in a first table of integrity, referred as "MAC-Table 1" in FIG. 2. This step is carried out by the second generator 306, referred as the MAC-Table 1 generator.

In the step of encryption S22, the authenticated segment Si' (Si|Ai) resulting from the step S20 is encrypted by execution of an encryption algorithm by the encryption unit 304. The encryption uses a first unique key $k_1$. The key $k_1$ can be stored in a secure area of the key memory 302. The result of the encryption is referenced as [Si'] and can be expressed as follows:

$$[Si']=[Si]|[Ai].$$

By definition, a unique key is a key that is generated uniquely for one processing device and is used only for said processing device in one or more cryptographic algorithms. In the present embodiment, the first unique key is a secret key, for example a key of 256 bits.

In the step S23 of producing the second MAC Bi, the second MAC is calculated by the MAC generator 303 using a MAC function M. The MAC function M is applied on the result of the step of encryption S22, i.e. on [Si']=[Si]|[Ai]. The MAC function uses a second unique key $k_2$. The key $k_2$ can be stored in a secure area of the key memory 302. In the present embodiment, the second unique key $k_2$ is a secret key, for example a key of 256 bits.

In the present embodiment, the first unique key $k_1$ and the second unique key $k_2$ are different. However, the keys $k_1$ and $k_2$ could be identical.

The authenticated and encrypted segment [Si'] and the second MAC Bi are concatenated (combined together), so as to form the segment Si" that contains the segment of digital information Si in encrypted form and doubly authenticated (authenticated on the plaintext and on the ciphertext), that can be expressed as follows:

$$Si''=[Si]|[Ai]|Bi.$$

In the present embodiment, after authenticating and encrypting the segment of digital information Si in steps S20 to S23, in a step 3, the resulting segment of digital information Si" (i.e. the segment of digital information in encrypted form and authenticated twice) is divided into two components. Indeed, separation of the integrity data and the encrypted digital information is performed in order to store the segment of digital information Si" into two separate components: the encrypted digital information [Si] (first component) and the integrity data [Ai]|Bi (second component). In other words, the integrity data containing the first integrity element in encrypted form [Ai] and the second integrity element Bi, in a concatenated form [Ai]|Bi, is separate from the corresponding segment Si in encrypted form, so that the two components can be stored separately in two different memory spaces or two different memories. This step S3 is performed by the separator 305.

The corresponding integrity data [Ai]|Bi is added in a second table of integrity referred as "MAC-Table 2" in FIG. 2, in a step S4. This step S4 is performed by the third generator 307, referred as a MAC-Table 2 generator. The second table of integrity contains the integrity data of all segments Si with 1≤i≤M. More precisely, it contains the elements [Ai]|Bi of all segments of digital information Si with 1≤i≤M.

The steps S2 to S4 are executed iteratively for each segment Si of the M segments of digital information, with 1≤i≤M, by the digital information provider 300.

After execution of the steps S1 to S4, the first table of integrity 'MAC-Table 1' contains the M first integrity elements Ai of the M segments Si of digital information. Then, in a step S5, the M first integrity elements Ai are signed. That is, all the MACs 'Ai' of the M segments of digital information are signed. In the present embodiment, one digital signature SIG is produced for the M elements Ai. A digital signature algorithm is used to generate this digital signature SIG from the M elements Ai and using a key. In the present embodiment, the key used for the signature is a private asymmetric key $K_{pr}$ belonging to a pair of keys including the private key $K_{pr}$ and an associated public key $K_{pub}$. For example, this pair of keys ($K_{pr}$, $K_{pub}$) was generated for the digital information provider and the private key $K_{pr}$ is only known by the authorized digital information provider. The key $K_{pr}$ is kept in a secure area by the digital information provider. It can be stored in a secure area of the key memory 302. Then, the digital signature SIG is added into the first table of integrity (step S5).

The first table of integrity MAC-Table 1, the second table of integrity MAC-Table 2 and the segments of digital information in encrypted form [Si] are stored in separate memory areas or in separate memories by the digital information provider.

Then, in a step S6, the digital information provider 300 stores the first table of integrity MAC-Table 1, the second table of integrity MAC-Table 2 and the segments of digital information in encrypted form [Si] are stored by the digital information provider 300 into the external memory 200, in different memory areas (or in different memories). The encrypted segment [Si] of digital information can be stored and stacked in a first memory area, while the first table of integrity MAC-Table 1 and the second table of integrity MAC-Table 2 can be stored in a second memory area and in a third memory area of the external memory 200. This step S6 is performed by the storing unit 310.

Alternatively, the digital information provider 300 could store the first table of integrity MAC-Table 1, the second table of integrity MAC-Table 2 and the segments of digital information in encrypted form [Si] directly, during the execution of steps S2 to S5.

Figure 4:
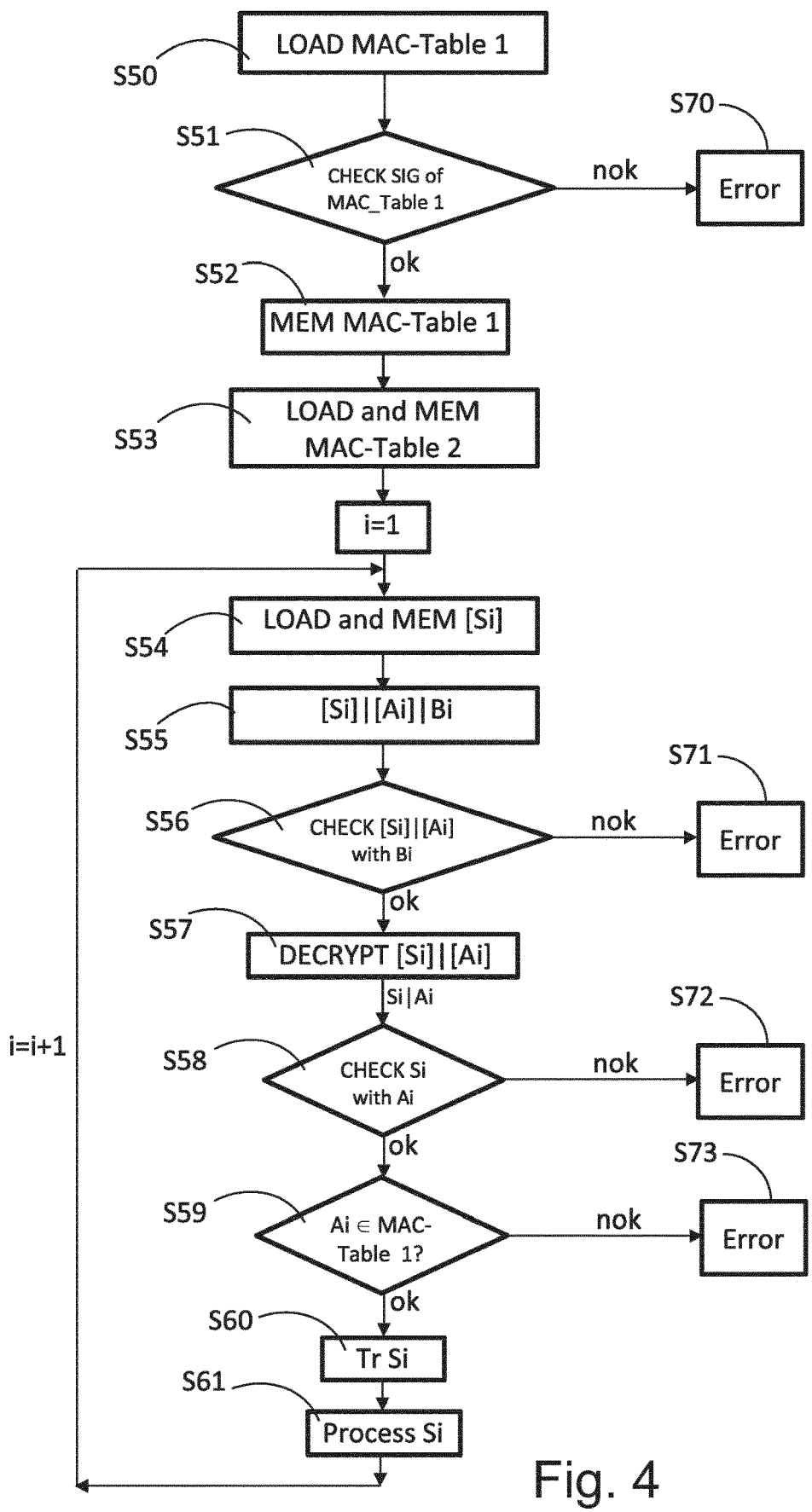
FIG. 4 represents a flowchart of a method of pre-processing and processing the digital information stored in the external memory, carried out by the processing device, according to an exemplary embodiment.

After execution of steps S1 to S6, the digital information prepared and stored in the external memory 200 can be loaded and processed (used) by the processing device 100, as will be explained later with reference to FIGS. 2 and 4.

The preparation of the digital information, as described in steps S1 to S6, is performed by the digital information provider 300 under control of program instructions. The program instructions are stored in one or more storage modules, such as volatile memory, e.g., RAM, etc., and/or non-volatile memory, e.g., ROM, Flash, NAND, etc., that is permanently or removably integrated in the digital information provider 300. Therefore, the present disclosure also concerns:

- a computer program comprising program instructions which, when the program is executed by a processor of the digital information provider 300, cause the digital information provider to perform the steps S1 to S6 of the method previously described
- a non-transitory computer readable medium comprising program instructions for causing the digital information provider 300 for preparing digital information to perform the steps S1 to S6 previously described.

Figure 5:
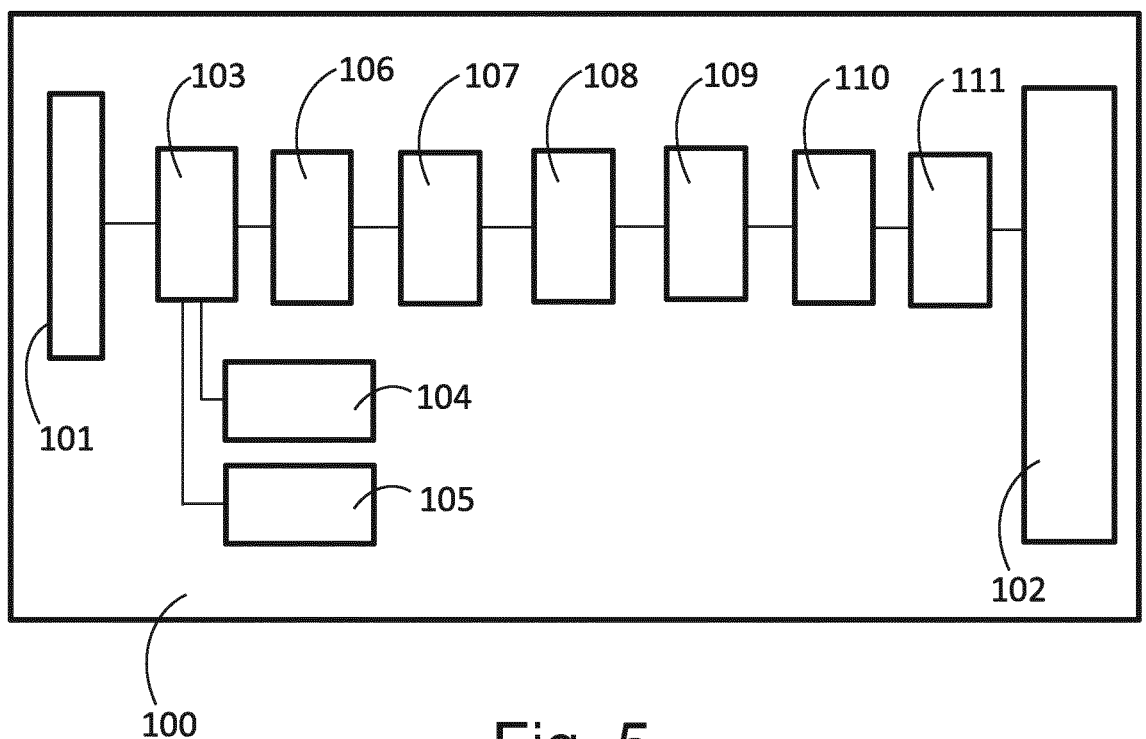
FIG. 5 represents schematically the processing device, according to an exemplary embodiment.

With reference to FIG. 5, the processing device 100 has a communication interface 101, a processing unit (CPU) 102, a loading unit 103, an integrity table storage unit 104, a segment storage unit 105 for storing segments of digital information, and at least one pre-processing unit 106-111 to pre-process (or prepare) the digital information to be processed by the processing unit 102. In the present embodiment, the processing device 100 has the following pre-processing units: a signature verification unit 106, a concatenation unit 107, a first integrity verification unit 108, a decryption unit 109, a second integrity verification unit 110 and a third integrity verification unit 111. Alternatively, different functions of these pre-processing units could be handled by the same pre-processing unit.

The processing unit (CPU) 102 is a processor that is intended to process (or use) the digital information stored in the external memory 200. It can be a secure processor with security features having a high assurance level certification for security-critical applications.

The storage units 104 and 105 are memories, for example volatile memories, such as RAMs (Random Access Memory). These memories could have a local scrambling and an encryption to protect them.

All exchanges (information, data, commands) between the external memory 200 and the processing unit 102 pass through the communication interface 101.

The signature verification unit 106 is configured to verify the authenticity of the first table of integrity MAC-Table 1, by checking its digital signature with the public key $K_{pub}$. The key $K_{pub}$ can be stored in a memory area of the signature verification unit 106.

The first integrity verification unit 108 is configured to verify the second integrity elements Bi related to the segments of digital information Si. In the present embodiment, it uses a MAC function and the key $k_2$ that can be stored in a secure memory area of the first integrity verification unit 108.

The second integrity verification unit 110 is configured to verify the first integrity elements Ai related to segments of digital information Si. In the present embodiment, it uses a MAC function and the key $k_0$ that can be stored in a secure memory area of the second integrity verification unit 110.

The third integrity verification unit 111 is configured to verify that the first integrity elements Ai concatenated with the segments of digital information Si correspond to the first integrity elements Ai contained in the first table of integrity MAC-Table 1.

The decryption unit 109 is configured to execute a decryption algorithm using the secret key $k_1$ in order to decrypt an encrypted element. The secret key $k_1$ is stored for example in a secure memory area of the decryption unit 109.

The processing device 100 can be a mix of hardware and software components.

The method for processing the digital information stored in the external memory 200, according to an exemplary embodiment, performed by the processing device 100, will now be described with reference to FIGS. 2 and 4. The respective functions of the elements 101-105 and the operation of the processing device 100 will become more apparent in the description of the method that follows.

Initially, the processing device 100 is switched on. Subsequently, a booting or startup procedure is executed by the processing device 100. The startup procedure can execute a security protocol like secure boot which can secure the boot process. In the startup procedure, the processing device 100 first loads the first integrity table MAC-Table 1 from the external memory 200, under control of the loading unit 103, in step S50. Then, the signature verification unit 106 verifies the digital signature of the MAC-Table 1 by using the public key $K_{pub}$, in a subsequent step S51. If the signature of the MAC-Table 1 is successfully verified, it means that the authenticity of the MAC-Table 1 is successfully checked and then the MAC-Table 1 is stored in the integrity table storage unit 104 (referred as 'MAC-RAM' in FIG. 2), in a step S52. If the check of the signature of the MAC-Table 1 is unsuccessful, the step S51 is followed by an error step S70. For example, in the error step S70, the method for processing the digital information is aborted (interrupted).

In the present embodiment, if the authenticity of the MAC-Table 1 has been successfully checked, the loading unit 103 further loads the second integrity table MAC-Table 2 from the external memory 200 and stores it into the integrity table storage unit 104 ('MAC-RAM' in FIG. 2), in a step S53. Thus, the second integrity table MAC-Table 2 is loaded separately from the segments of digital information Si.

Under control of the loading unit 103, the processing device 100 loads the segments of digital information Si, in protected form, with 1≤i≤M. The segments Si are loaded on the fly when their content is needed. The segments Si can be loaded. For each segment Si to be loaded, the following steps S54 to S61 are executed iteratively from i=1 to i=M. The steps S54 to S61 will now be described for the index i.

In the step S54, the loading unit 103 loads the encrypted segment [Si] from the external memory 200 and stores the loaded [Si] into the storage unit 105. The segments of digital information Si can be successively loaded to be processed, one by one, by successive external accesses to the external memory 200. Alternatively, a plurality of segments of digital information could be loaded in one external access to the external memory 200, depending on the storage capacity of the processing device 100.

In the step S55, the encrypted segment [Si] and the corresponding integrity data, extracted from the second integrity table MAC-Table 2, are concatenated together (put together) by the concatenation unit 107. The integrity data includes the first integrity element [Ai] in encrypted form and the second integrity element Bi, that are both concatenated in the form [Ai]|Bi. The loaded encrypted segment [Si] and the corresponding integrity data are linked by a common identifier, for example an order index (the same order index in the loading and in the table). The step S55 results in outputting the segment of digital information in the protected form (i.e. authenticated, then encrypted and then authenticated again):

$$Si''=[Si]|[Ai]|Bi.$$

In the step S56, the processing device 100 verifies the integrity of the segment of digital information Si" (in protected form) resulting from the step S55. To this end, the first integrity verification unit 108 calculates an integrity element, here a MAC, from the loaded segment Si": it takes the part [Si]|[Ai] of Si" as an input and computes an integrity element from this part [Si]|[Ai] by using the MAC function and the unique key $k_2$. Then, it compares the computed integrity element with the integrity element Bi extracted from the segment Si". If they match, the integrity of the segment of digital information [Si]|[Ai] in protected form (authenticated and then encrypted) is successfully verified and the method goes to the step S57. If they do not match, the integrity of the segment of information is denied and the method goes to an error step S71.

In case that the integrity of segment Si is successfully checked in the step S56, the decryption and an integrity verification after decryption are enabled and performed in steps S57 and S58.

In the step S57, the decryption unit 109 decrypts the component [Si]|[Ai] (i.e. the encrypted segment [Si] and the encrypted first integrity element [Ai] concatenated together), using the unique key $k_1$. The decryption unit 109 outputs the segment of digital information Si and the integrity element Ai, both in clear (plaintext).

Then, in the step S58, the second integrity verification unit 110 verifies the integrity of the segment of digital information Si in clear. The integrity of the digital information in clear is verified on the segment Si resulting from the decryption step S57. More precisely, the second integrity verification unit 110 takes the segment of digital information Si as an input and calculates an integrity element (here a MAC) from it, using the MAC function and the global key $k_0$. Then, the second integrity verification unit 110 compares the integrity element calculated from the segment Si to the integrity element Ai resulting from the decryption step S57. If they match, the integrity of the digital information in clear is successfully verified. Then, the method goes to a step S60 explained later. If they do not match, the integrity of the segment of digital information Si in clear is denied and the method goes to an error step S72.

In a step S59, the processing device 100 checks whether or not the first integrity element Ai concatenated with the segment Si, resulting from the decryption S57, matches a corresponding first integrity element of the second table of integrity MAC-Table 2. If the first integrity element Ai concatenated with the segment Si matches a first integrity element present in the second table of integrity MAC-Table 2, the method goes to step S60. If the first integrity element Ai concatenated with the segment Si does not match a first integrity element of the second table of integrity MAC-Table 2, the method goes to an error step S73. This step S59 is performed by the third integrity verification unit 111.

The steps S58 and S59 are both executed after the decryption S57 and can be carried out in parallel or successively in any order.

The step S60 is carried out by the processing device 100 if the verifications of the steps S58 and S59 are both successful. In this step S60, the segment of digital information Si resulting from the decryption S57 is transferred to the processor 102 to be processed (used) by the central processing unit 102 in a step S61.

The error steps S71, S72 and S73 can consist in aborting the processing of the digital information. Alternatively, the error steps S71, S72 and S73 may result in handling segment Si as not relevant and discarding it (i.e., not processing or not using it and erasing it).

The pre-processing and processing of the digital information, as described in steps S50 to S61 and S70-S73, is performed by the processing device 100 under control of program instructions. The program instructions are stored in one or more storage modules, such as volatile memory, e.g., RAM, etc., and/or non-volatile memory, e.g., ROM, Flash, NAND, etc., that is permanently or removably integrated in the processing device 100. Therefore, the present disclosure also concerns:
- a computer program comprising program instructions which, when the program is executed by a processor of the device 100 for processing digital information, cause the device to perform the steps S50 to S61 and S70-S73 previously described;
- a non-transitory computer readable medium comprising program instructions for causing the processing device 100 for preparing digital information to perform these steps S50 to S61 and S70-S73 previously described.

In the first embodiment, the second table of integrity MAC-Table 2 is loaded in the startup procedure and stored in the integrity table storage unit 104 (e.g. a RAM).

Figure 7:
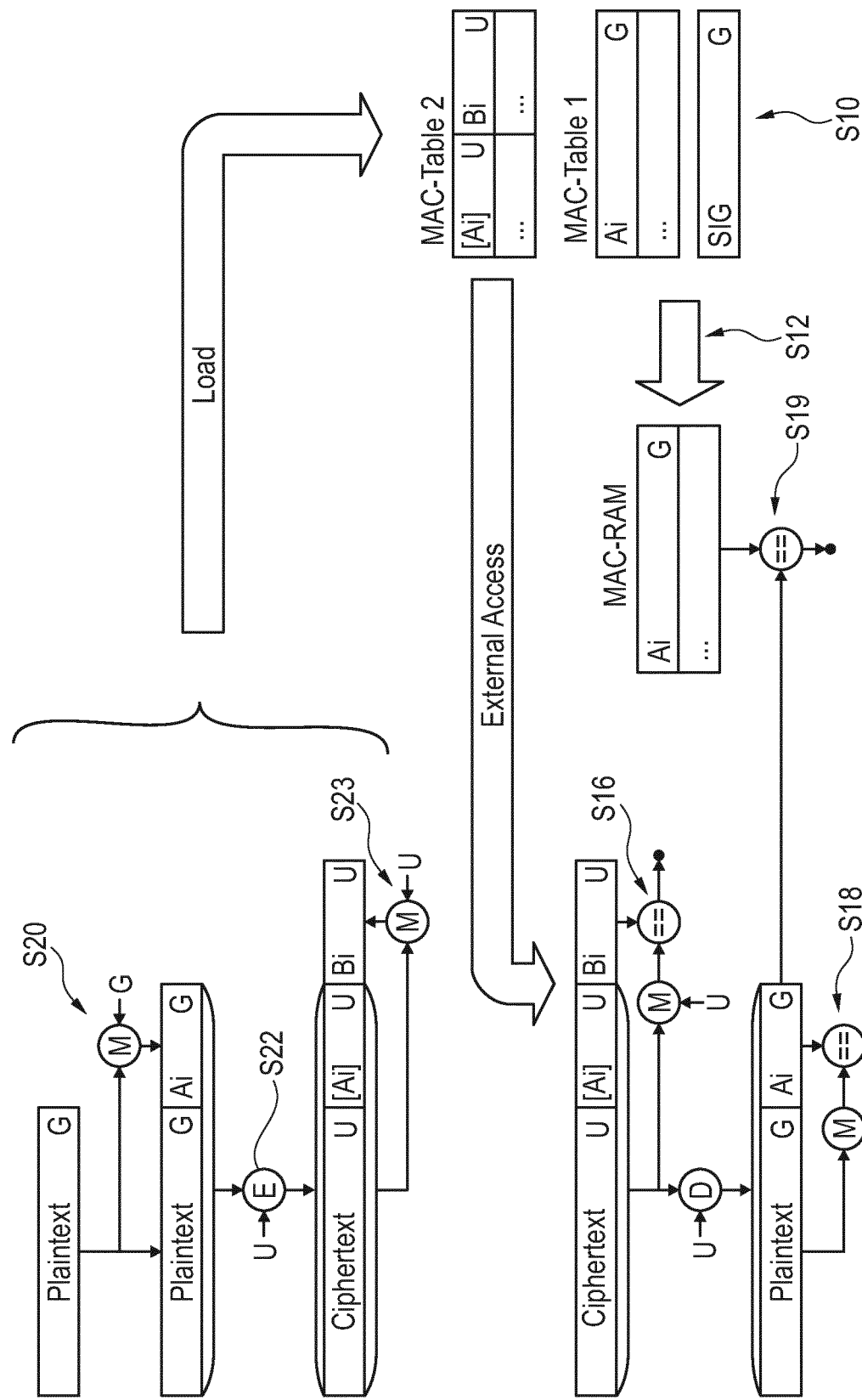
FIG. 7 illustrates schematically the digital information when it is prepared to be stored in an external memory, and when it is loaded and read (or pre-preprocessed) by the processing device, according to a second exemplary embodiment.

With reference to FIG. 7, a second embodiment is based on the first embodiment but only differs from it in that the second table of integrity MAC-Table 2 is not loaded in the startup procedure. Instead, the second table of integrity MAC-Table 2 stays in the external memory 200 and, for each segment of digital information [Si] to be processed that is handled by the processing device 100, the processing device 100 performs an external access to the external memory 200 and loads the corresponding integrity data [Ai]|Bi from the second integrity table MAC-Table 2 that is stored in the external memory 200. The loading unit 103 loads the corresponding integrity data [Ai]|Bi from the external memory 200 each time a new segment of digital information in encrypted form is handled (i.e. loaded from the external memory and/or retrieved from the segment storage unit 105, in order to be processed) by the processing device 100 to be processed by the processor 102.

In the first and second embodiments, the segments of digital information in encrypted form [Si] and the integrity data [Ai]|Bi are loaded separately and then concatenated together. Alternatively, the segments of digital information in the protected form [Si]|[Ai] and the integrity data Bi could be loaded separately.

Using asymmetric cryptographic for authenticating the segments of digital information is more secure. However, a symmetric key could be used to authenticate the segments of digital information.

In the present disclosure, the step S50 of loading the first integrity table MAC-Table 1 is executed during a startup procedure of the processing device 100. Advantageously, the first integrity table MAC-Table 1 could be reloaded after the startup procedure, in certain circumstances.

As previously indicated, the processing device 100 comprises software components having program instructions to perform at least part of the steps S50-S61, S71-S73 of the method for processing the digital information. The present disclosure also concerns a non-transitory computer readable medium comprising program instructions for causing the device for processing digital information 100 to perform these steps, in particular the steps of:
- loading S50 a first integrity table MAC-Table 1 containing a plurality of first integrity elements Ai respectively authenticating the plurality of segments of digital information Si, and an associated digital signature SIG of said plurality of first integrity elements Ai, from the external memory 200;
- verifying S51 the digital signature SIG associated with the first integrity table MAC-Table 1,
- loading S54 segments of digital information [Si] in a protected form from the external memory 200 to the processing device 100.

As previously indicated, the digital information provider 300 comprises software components having program instructions to perform at least part of the steps S1 to S6 of the method of preparing the digital information to be stored in the external memory 200. The present disclosure also concerns a non-transitory computer readable medium comprising program instructions for causing the digital information provider 300 to perform these steps, in particular the steps of:
- segmenting S1 the digital information in a plurality of segments of digital information Si;
- computing S20 a first integrity element Ai for each of said plurality of segments of digital information Si to obtain a plurality of first integrity elements respectively associated with the plurality of segments of digital information;
- generating S21 a first integrity table MAC-Table 1 containing said plurality of first integrity elements Ai and computing a digital signature SIG of said plurality of first integrity elements;
- protecting S22 the segments of digital information Si respectively concatenated with the associated first integrity elements Ai by performing at least one cryptographic operation.

The invention claimed is:

1. A method for processing digital information, performed by a processing device, said digital information being stored in a plurality of segments in an external memory, the method comprising:
loading a first integrity table containing a plurality of first integrity elements respectively authenticating the plurality of segments of digital information, and an associated digital signature of said plurality of first integrity elements, from the external memory;
verifying the digital signature associated with the first integrity table,
after loading the first integrity table and verifying the associated digital signature, loading encrypted segments of digital information from the external memory to the processing device;
loading separately integrity data of the segments of digital information from the external memory, wherein the integrity data of each segment of digital information includes a first integrity element encrypted and a second integrity element authenticating encrypted data resulting from an encryption of said segment of digital information concatenated with said first integrity element; and, for each segment of digital information:
concatenating the encrypted segment of digital information that has been loaded and the corresponding integrity data loaded separately;

verifying the integrity of the encrypted segment of digital information concatenated with the first integrity element encrypted using the second integrity element;

decrypting the segment of digital information and the first integrity element and outputting the segment of digital information and the first integrity element concatenated together;

verifying the integrity of the segment of digital information using the concatenated first integrity element;

checking that the first integrity element matches a corresponding first integrity element in the first integrity table, an authenticity of the segment being indirectly verified by the verification of the digital signature associated with the first integrity table; and processing the segment of digital information.

2. The method according to claim 1, wherein the step of loading the first integrity table is executed during a startup procedure of the processing device.

3. The method according to claim 1, wherein the processing device loads, from the external memory, a second integrity table containing the integrity data for each of the plurality of segments of digital information, stores said second integrity table in an internal memory, and, for each encrypted segment of digital information that has been loaded, retrieves the corresponding integrity data from the second integrity table that is stored in the internal memory in order to concatenate the encrypted segment of digital information and the corresponding integrity data.

4. The method according to claim 1, wherein, for each segment of digital information to be processed that is handled by the processing device, the processing device performs an external access to the external memory and loads the corresponding integrity data from a second integrity table that is stored in the external memory.

5. The method according to claim 1, wherein the step of verifying the signature of said plurality of first integrity elements is performed using a global key, wherein the global key is a key that is generated and can be used for a plurality of processing devices in one cryptographic algorithm.

6. The method according to claim 1, wherein the step of verifying the integrity of the segment of digital information using the first integrity element concatenated with said segment of digital information is performed further using a global key, wherein the global key is a key that is generated and can be used for a plurality of processing devices in one cryptographic algorithm.

7. The method according to claim 1, wherein the step of verifying the integrity of the encrypted segment of digital information concatenated with the first integrity element encrypted using the second integrity element and the step of decrypting the segment of digital information and the first integrity element are performed using one or two unique keys, wherein each unique key is a key generated uniquely for the processing device.

8. A non-transitory computer-readable medium comprising program instructions for causing the processing device for processing the digital information to perform the steps of the method of claim 1 when executed by processing circuitry of the processing device.

9. A method for producing digital information, comprising:

segmenting the digital information in a plurality of segments of digital information;

computing a first integrity element for each of said plurality of segments of digital information, wherein the first integrity element allows authenticating the corresponding segment of digital information, in order to obtain a plurality of first integrity elements respectively associated with the plurality of segments of digital information;

generating a first integrity table containing only said plurality of first integrity elements, computing a single digital signature using said plurality of first integrity elements contained in the first integrity table, and adding said single digital signature to the first integrity table;

encrypting the segments of digital information respectively concatenated with the associated first integrity elements to output encrypted data; and for each segment of digital information:
computing a second integrity element authenticating the encrypted data resulting from encrypting said segment of digital information concatenated with said first integrity element and concatenating said encrypted data and the second integrity element;

separating the encrypted segment of digital information and integrity data that includes the first integrity element encrypted and the second integrity element;

adding said integrity data into a second integrity table; and storing the first integrity table, the second integrity table and the encrypted segments of digital information in a memory.

10. A non-transitory computer-readable medium comprising program instructions for causing a digital information provider to perform the steps of the method of claim 9 when executed by processing circuitry of the digital information provider.

11. A device for processing digital information stored in a plurality of segments in an external memory, the device comprising:

processing circuitry configured to
load, from the external memory, a first integrity table containing a plurality of first integrity elements respectively authenticating the plurality of segments of digital information, and an associated digital signature of said plurality of first integrity elements, verify the digital signature associated with the first integrity table;

after loading the first integrity table and verifying the associated digital signature, loading from the external memory, encrypted segments of digital information;

loading separately, from the external memory, integrity data of the segments of digital information, wherein the integrity data of each segment of digital information includes a first integrity element encrypted and a second integrity element authenticating encrypted data resulting from an encryption of said segment of digital information concatenated with said first integrity element and are loaded separately from the segment of digital information;

concatenate an encrypted segment of digital information that has been loaded and the corresponding integrity data loaded separately;

verify the integrity of the encrypted segment of digital information concatenated with the first integrity element encrypted using the second integrity element;

decrypt the segment of digital information and the first integrity element and output the segment of digital information and the first integrity element concatenated together;

verify the integrity of the segment of digital information using the concatenated first integrity element;
check that the first integrity element matches a corresponding first integrity element in the first integrity table, an authenticity of the segment being indirectly verified by the verification of the digital signature associated with the first integrity table; and
process the segment of digital information.

12. A system, comprising:
the processing device according to claim 11, and
the external memory storing:
the digital information in the plurality of segments of digital information;
the first integrity table containing the plurality of first integrity elements respectively authenticating the plurality of segments of digital information and the digital signature of said plurality of first integrity elements; and
a second integrity table containing integrity data of the segments of digital information, wherein the integrity data of each segment of digital information includes the first integrity element encrypted and the second integrity element authenticating encrypted data resulting from an encryption of said segment of digital information concatenated with said first integrity element.

13. A digital information provider for producing digital information, comprising:
processing circuitry configured to
segment the digital information in a plurality of segments of digital information;
generate a first integrity element for each of said plurality of segments of digital information, wherein the first integrity element allows authenticating the corresponding segment of digital information, in order to obtain a plurality of first integrity elements respectively associated with the plurality of segments of digital information;
generate a first integrity table containing only said plurality of first integrity elements and a single digital signature using said plurality of first integrity elements contained in the first integrity table;
encrypt the segments of digital information respectively concatenated with the associated first integrity elements into encrypted data, wherein the processing circuitry is further configured to generate a second integrity element authenticating the encrypted data resulting from encrypting said segment of digital information concatenated with said first integrity element and concatenating said encrypted data and the second integrity element;
separate the encrypted segment of digital information and integrity data that includes the first integrity element encrypted and the second integrity element; and
generate a second integrity table containing said integrity data of each segment of digital information; and
a memory to store the first integrity table, the second integrity table, and the encrypted segments of digital information in a memory.

* * * * *